April 9, 1968     W. L. WILCOX     3,376,608
CHECK VALVE FOR INJECTION MOLDING APPARATUS
Filed March 21, 1966

INVENTOR.
WILLIAM L. WILCOX
BY
ATTORNEY

United States Patent Office 3,376,608
Patented Apr. 9, 1968

3,376,608
CHECK VALVE FOR INJECTION
MOLDING APPARATUS
William L. Wilcox, Malden, Mass., assignor to International Vulcanizing Corporation, Waltham, Mass., a corporation of Massachusetts
Filed Mar. 21, 1966, Ser. No. 535,928
8 Claims. (Cl. 18—42)

This invention relates to injection molding of footwear and especially to forming bottoms with two layers of an elastomer of the same or different kind and/or color by double injection.

For double injection the mold assembly comprises essentially a mold ring above which the lasted upper is held and a sole plate movable at the lower side of the ring to form with the ring a mold cavity below the lasted upper. The mold ring is usually split longitudinally and contains two injection passages, one half of each of which is located in each of the confronting faces of the halves of the ring. One of the passages provides for a first injection with the sole plate raised to form an insole and, if desirable, a foxing and toe cap. The other passage provides for a second injection with the sole plate lowered to form an outsole. The passage in the side ring through which the first injection is made is in direct communication with the mold cavity. However, the passage through which the second injection is made is connected to the mold cavity by way of an injection passage in the sole plate beneath the upper surface thereof, and one or more orifices or entrances connecting the injection passage to the interior of the mold cavity. Such equipment is conventional but has the disadvantage that during first injection some of the elastomer is forced into and through the orifice or orifices in the surface of the sole plate into the injection passage beneath the surface and this interferes with free flow of the elastomer during the second injection from the injection passage into the mold cavity. In addition, following the second injection, when the injection pressure is cut off the elastomer bleeds back from the mold cavity through the orifice or orifices into the injection passage. Various expedients have been employed to cover the orifice or orifices in the sole plate during the first injection to prevent such blocking and to eliminate bleed-back following the second injection. However, none have proved entirely satisfactory and the present invention has for its principal objects to provide means for preventing flow of the elastomer from the mold cavity into the injection passage in the sole plate during the first injection and bleed-back following the second injection without participation on the part of the operator; to provide means which limits flow of the elastomer into the orifice or orifices into the sole plate so that the nub formed is so small that it will be buried by the second injection; to provide means which operates automatically to admit the elastomer to the mold cavity when elastomer is supplied under pressure to the injection passage in the sole plate and automatically prevent bleed-back from the mold cavity into the injection passage when the injection of elastomer is cut off; to provide means which can be added to conventional equipment without costly redesign; and to provide means which is adjustable, requires little servicing and is reliable. While the invention is described specifically with reference to double injection mold assemblies designed for applying bottoms to shoes, it is to be understood that it has general application to single injection molding apparatus for the purpose of preventing bleeding of the elastomer from the mold cavity following cut off.

Broadly, the invention resides in the combination with a mold providing a cavity for receiving an elastomer by injection of an injection passage for conducting an elastomer into the cavity and a check valve situated in the passage which normally occupies a position blocking the entrance of the passage into the cavity. The valve is movable by the pressure of the elastomer into the passage when injection pressure is supplied to a position uncovering the entrance to permit flow from the passage into the mold cavity, and there is means operable to return the valve to the blocking position when the injection pressure is cut off to prevent bleeding of the elastomer from the mold cavity into the injection passage. More specifically, as herein illustrated, the mold embodies a sole plate containing an injection passage and at least one orifice from the injection passage through the upper surface of the sole plate into the mold cavity, a part located in the injection passage movable from a position permitting flow of elastomer from the injection passage through the entrance to a position blocking such flow, means normally holding the part in a position blocking entrance, and means operable by the pressure of the elastomer in the injection passage, when the injection pressure is applied, to move the part to a position permitting flow through the entrance into the mold cavity. The part is a valve slidably supported in the injection passage containing at least one hold which, when aligned with an orifice in the sole plate, permits elastomer delivered to the injection passage to pass through the orifice into the mold cavity. Conveniently, the valve is a thin wall tube slidably fitted into the injection passage containing in its wall a hole through which the elastomer can flow. A spring mounted in the injection passage adjacent one end of the tube normally holds the tube with the hole therein displaced relative to the orifice, and a piston associated with the tube is operable, by the pressure of the elastomer, to displace the tube in opposition to the spring in a direction to align the hole with the orifice. A pin is mounted in the sole plate with a part projecting into the passage into an axial slot in the tube and functions, on the one hand, to prevent rotation of the sleeve in the passage and, on the other hand, to limit axial movement of the tube in either direction. There may be one or more orifices in the sole plate and the tube. The valve, furthermore, may also comprise a short thin wall tube terminating in length where the hole is provided through which the elastomer can flow into the orifice in the soleplate and hence into the mold cavity. This alternate valve is usable when only one orifice is provided in the sole plate.

The invention will now be described in greater detail with reference to the accompanying drawings wherein.

Figure 1:
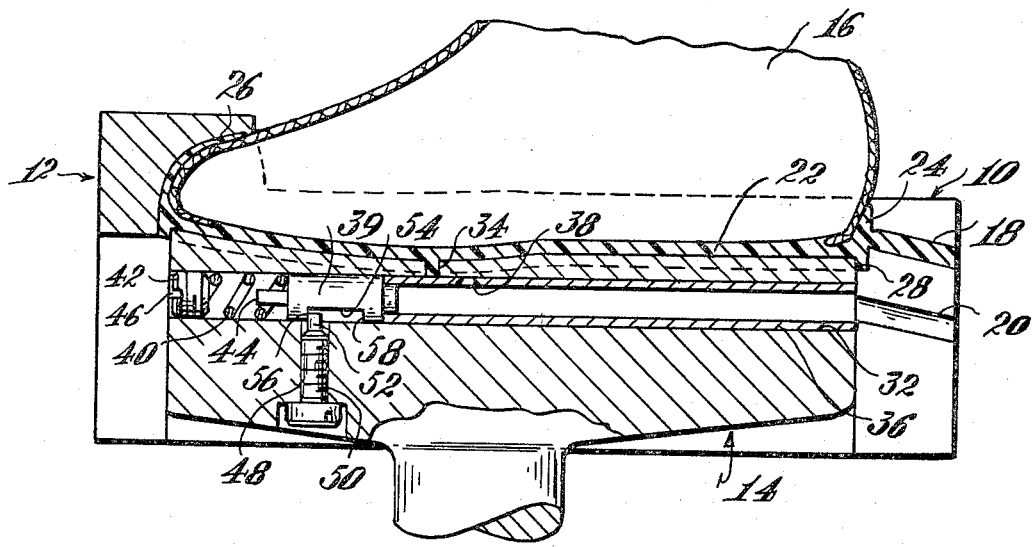
FIG. 1 is a view longitudinally of the mold assembly with the mold parts and shoe partly in elevation and partly in section showing the sole plate raised and an insole layer of elastomer including a foxing strip and toe cap applied directly to the lasted upper.

Referring to the drawings (FIG. 1), there is illustrated a conventional type of mold assembly comprising a side ring 10 which is split longitudinally, only one half being illustrated, a toe cap mold 12 supported on the upper surface of the side ring, and a sole plate 14 supported for movement within the side ring relative to the bottom of a lasted upper 16 which rests on the top of the side ring. The side ring contains two injection passages 18 and 20, each of the halves of the side ring containing one half of each of the passages 18 and 20.

Figure 2:
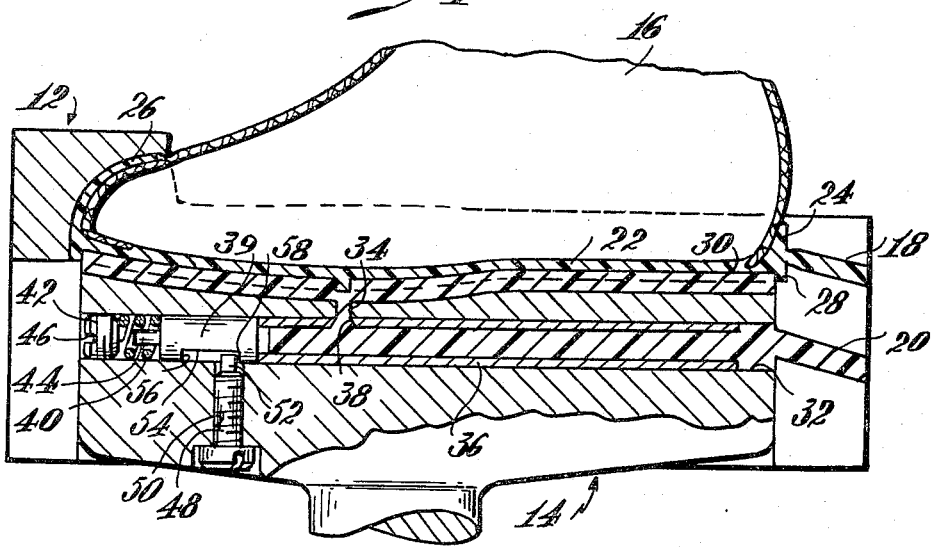
FIG. 2 is a similar view with the sole plate lowered and with an outsole layer applied to the lower surface of the inner sole illustrated in FIG. 1.

In accordance with conventional practice, the lasted upper 16 is placed on the top of the side ring over the mold cavity, the sole plate 14 is raised to a position close to the bottom of the lasted upper to provide a cavity of suitable depth and an elastomer is injected through the passage 18 at the interfaces of the mold ring directly into the mold cavity to form a first layer or insole 22 of suitable thickness. As herein shown, the insole 22 includes an integral, upwardly extending peripheral flange 24 which forms an edge strip or foxing strip around the shoe, a toe cap 26 and a downwardly extending peripheral flange 28. Following injection of the first or insole layer 22, the sole plate 14 is lowered to a position such as shown in FIG. 2 to provide a cavity below the insole layer, an elastomer is injected through a passage 20 at the interfaces of the mold ring into one end of an injection passage 32 which extends longitudinally through the sole plate below the surface and through one or more orifices 34, only one of which is shown herein, which extend from the injection passage 32 through the surface of the sole plate into the mold cavity.

If no means is provided for stopping the orifice or orifices in the sole plate during injection of the insole layer, the elastomer will flow from the mold cavity through the sole plate into the injection passage therein, and if no means is provided for stopping the orifice or orifices in the sole plate following injection of the outsole layer, the elastomer will bleed-back from the mold cavity through the sole plate into the injection passage. To eliminate the foregoing a check valve is provided in the passage 32. In its preferred form the check valve is a thin wall tube 36 corresponding in outside diameter to the inside diameter of the injection passage 32 and of lesser axial length than the injection passage 32, which contains a hole 38 adapted to be aligned with the orifice 34 by movement of the tube 36 axially within the injection passage. The check valve, in the alternate, may comprise a thin wall tube that terminates in length where the hole 38 is provided. The tube 36 is open at the end adjacent the passage 20, is closed at the opposite end and has secured to this opposite end a piston 39 which closely fits the inside of the injection passage 32. The tube 36 is normally held displaced, that is with the hole 38 displaced relative to the orifice 34 by means of a coil spring 40, one end of which bears against the distal end of the piston 39 and the other end of which bears against a threaded plug 42 screwed into the open end of the passage 32 at the opposite extremity of the sole plate from the passage 20. A nub 44 may be provided at the distal end of the piston 39 to control the spring and the plug is provided with a slot 46 for receiving a screw driver or the like to enable adjusting it thus to adjust the compression in the spring 40.

A limit screw 48 is threaded in a hole 50 in the sole plate into the injection passage 36 and has at its inner end a pin 52 which projects into a slot 54 located longitudinally of the piston 39. Interengagement of the pin and slots 52 and 54 prevents rotation of the tube in the injection passage and also limits axial movement of the tube within the injection passage by engagement of the pin 52 with one or the other of the ends of the slots. As illustrated, the slot is of such length that the shoulder 56 at the left end limits movement of the tube in a direction toward the passage 20 such that the end adjacent the passage 20 substantially abuts the inner surface of the side ring (FIG. 1) and the shoulder 58 at the right end of the slot limits axial movement of the tube toward the left to a position in which the hole 38 is in registration with the orifice 34 (FIG. 2). Of course, as already stated, the tube 36 may terminate in length where the hole 38 is provided.

The tube 36 constitutes a check valve which prevents flow of the elastomer during the first injection from entering any more than the orifice 34 since at this time the tube is displaced toward the right by the spring 40. At most, during first injection a relatively short nub of elastomer is formed in the orifice 34 and if it remains attached to the insole it becomes buried in the outsole formed during the second injection, as shown in FIG. 2, so that it is entirely unobjectionable. If the nub breaks off in the orifice it will be forced into the mold cavity upon application of the second injection pressure since there is no overflow into the tube 36 to anchor it.

During second injection after the elastomer which has been injected to form the insole has been allowed to set up, the sole plate 14 is lowered and elastomer is injected through the passage 20 and from thence into the tube 36. By properly adjusting the compression in the spring 40 so that it will be overcome by the injection pressure of the injector, flow of the elastomer into the tube 36 will act upon the proximal end of the piston 39 to move the tube 36 axially toward the left until the shoulder 58 engages the pin 56. At this position the hole 38 is aligned with the orifice 34 and the elastomer will flow through the orifice 34 into the cavity between the lowered upper surface of the sole plate and the already formed insole. As soon as injection is completed and injection pressure is cut off, the spring 40 will displace the tube 36 toward the right thus closing the orifice 34, leaving only the small amount of elastomer in the orifice or on the lower surface of the outsole since the tube prevents flow into the injection passage. This small nub of elastomer sometimes pulls out of the orifice when the shoe is removed and if it does can be easily cut or scrubbed off the bottom and sometimes it merely breaks off, remaining in the orifice and is forced into the outsole layer during the following bottom-attaching operation.

Figure 3:
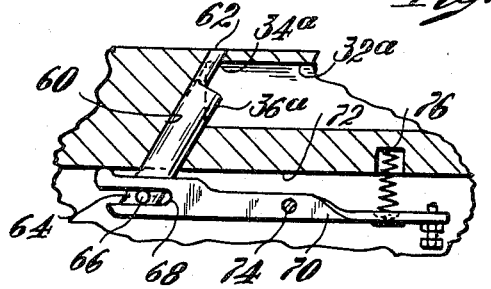
FIGS. 3 and 4 are fragmentary illustrations of alternate forms of check valves which may be employed to supply elastomer to an injection mold through a sole plate such as illustrated in FIGS. 1 or 2 or through any other part of a closed mold.
Figure 4:
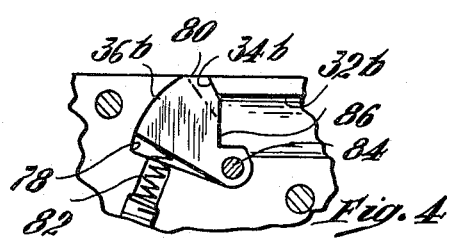

The invention in its broadest concept resides in the operation of a check valve by means of injection pressure and while the form of the invention illustrated in FIGS. 1 and 2 is preferred, other forms of check valve may be employed such as shown in FIGS. 3 and 4.

In FIG. 3 the injection passage 32a in the sole plate is connected to the interior of the mold cavity through the surface by an inclined orifice 34a and a valve rod 36a is supported in a hole 60 in the sole plate with one end 62 in a position to block the orifice 34a and the other end 64 connected by a pin 66 and slot 68 to one end of an arm 70. The arm 70 is pivotally supported within a recess 72 at the underside of the sole plate on a pin 74 and is yieldably biased by a spring 76 in a clockwise direction about the axis of the pin 74 so as normally to hold the valve end 62 in a closed position. Application of pressure of elastomer through the injection passage 32a will displace the valve rod 36a to an open position in opposition to the spring 76.

In FIG. 4 the injection passage 32b is connected to the mold cavity by an orifice 34b. A sector-shaped valve plate 36b is mounted in a slot 78 in the sole plate at the end of the passage 32b and has at one edge a projection 80 shaped to fill the orifice 34b and hence to close it. The valve plate is pivotally supported on a pin 84 and a spring 82 yieldably engaged with one edge holds it in a closed position. The opposite edge, that is the edge intersecting the passage, is provided with a surface 86 against which the pressure of the elastomer is operable to swing the plate about its pivot bin 84 thus to withdraw the part 80 from the orifice 34b and permit the elastomer to flow into the mold cavity.

The check valve illustrated in each of the figures is used in conjunction with the double injection shoe molding assembly; however, it is equally useful for single injection mold assemblies and for molds not intended especially for shoe manufacturing purposes to prevent bleed from the mold cavity following cut-off of the injection pressure. In addition to the check valves illustrated in the drawings, an alternate check valve may comprise a thin wall tube that terminates in length where the hole 38 is provided in the tube 36 as shown in FIGS. 1 and 2.

I claim:

1. In a mold assembly comprising a side ring and sole plate movable relative to the bottom of the side ring, said sole plate containing a passage providing at least one entrance through its upper surface into the mold cavity through which an elastomer may be injected into the mold cavity, a valve having a part located between the passage and the entrance to the mold cavity movable between a position blocking flow from the passage through the entrance to a position permitting flow from the passage to the entrance, means normally holding the valve in the position blocking flow of elastomer, said valve being a thin-wall tube slidably disposed in the passage, said tube containing a hole in its wall movable relative to said entrance to a position of alignment therewith to permit flow from the interior of the tube to the entrance into the mold cavity, and means operable, by the pressure of the elastomer in the injection passage when injection pressure is applied, to move the valve to the position permitting flow from the passage to the entrance.

2. A mold assembly according to claim 1, wherein the injection passage is situated below the upper surface of the sole plate and the entrance from the injection passage to the mold cavity is an orifice which conects the passage to the mold cavity.

3. A mold assembly according to claim 1, wherein a spring means normally holds the tube in a position such that the hole and the entrance to the mold cavity are displaced relative to each other, and a piston associated with the tube is operable by the injection pressure of the elastomer to displace the tube to a position such that the hole and the entrance to the mold cavity are aligned.

4. A mold assembly according to claim 1, wherein a coiled spring disposed between an end of the passage and the tube holds the tube in a position such that the hole is displaced relative to the entrance to the mold cavity, a piston is associated with the tube of sufficient area such that injection pressure of the elastomer overcomes the spring means and shifts the tube to a position of alignment of the hole with the entrance to the mold cavity, and a limit stop is situated in the path of movement of the tube operable to limit movement in response to injection pressure to said position of alignment.

5. A mold assembly according to claim 4, wherein the limit stop, by engagement with a slot in the surface of the piston situated axially with respect to the axis of the tube, prevents rotation of the tube within the passage.

6. A mold assembly according to claim 4, wherein the spring means is situated in the injection passage between the distal end of the piston, and a plug threaded into the open end of the injection passage opposite the distal end of the piston operable by rotation to adjust the compression in the spring.

7. A mold assembly comprising a side ring and a sole plate movable relative to the bottom of the side ring, said sole plate containing a passage lengthwise thereof, an orifice from the passage through the upper surface of the sole plate into the mold cavity, a thin-wall tube shorter than the axial length of the passage slidably mounted in the passage, said tube containing a hole adapted to be aligned with the orifice by movement of the tube axially in the passage, a piston associated with the tube operable, by the pressure of the elastomer, to effect displacement of the tube in the passage, a plug threaded into the open end of the passage opposite the piston, a coiled spring disposed in the passage between the plug and the opposite end of the piston operable to hold the tube with the hole therein displaced relative to the orifice, the outer end of the tube being in direct communication with the injection opening so that elastomer flows through the tube and from thence through the hole therein when the latter is in alignment with the orifice into the mold cavity, and a pin supported with a part projecting into the passage, said pin being cooperable with longitudinally spaced shoulders movable with the tube to limit axial movement of the tube in the passage, on the one hand, by the spring and, on the other hand, by the pressure of the elastomer.

8. In a mold assembly providing a cavity for receiving an elastomer by injection, an injection passage for conducting an elastomer into the cavity and a check valve situated in the passage, said check valve normally occupying a position blocking the entrance of the passage into the cavity and being movable by the pressure of the elastomer supplied to the passage to a position uncovering said entrance to permit flow from the passage into the cavity, said valve being a tube having a side surface and ends, and a hole connecting one end with the side surface, said valve being movabyle in the passage relative to said entrance by the pressure of the elastomer delivered to said passage at said one end to align the hole in said side surface of the valve with said entrance, and there is means bearing upon the other end of the valve operable to move the valve in a direction to displace the hole in the side surface relative to the entrance when the injection pressure is cut off, and means operable to return the valve to said blocking position when the injection pressure is cut off.

References Cited

UNITED STATES PATENTS

| | | |
|---|---|---|
| 2,456,778 | 12/1948 | Gilchrist. |
| 2,471,148 | 5/1949 | Gale et al. |
| 2,891,282 | 6/1959 | Neitlich. |
| 3,014,242 | 12/1961 | Baker et al. |
| 3,023,458 | 3/1962 | Seymour. |

OTHER REFERENCES

| | | |
|---|---|---|
| 1,325,875 | 3/1963 | France. |
| 1,187,363 | 2/1965 | Germany. |
| 995,243 | 6/1965 | Great Britain. |

J. HOWARD FLINT, JR., *Primary Examiner.*